(12) United States Patent
Abraham et al.

(10) Patent No.: US 11,402,531 B2
(45) Date of Patent: Aug. 2, 2022

(54) METHOD OF PACKAGING AND DEPLOYING MARINE VIBRATOR

(71) Applicant: Applied Physical Sciences Corp., Groton, CT (US)

(72) Inventors: Bruce M. Abraham, Lyme, CT (US); James A. McConnell, Clinton, CT (US); William M. Milewski, Lyme, CT (US); Brendan C. Woolrich, Groton, CT (US); Russell R. Rekos, Wakefield, RI (US)

(73) Assignee: Applied Physical Sciences Corp., Groton, CT (US)

( * ) Notice: Subject to any disclaimer, the term of this patent is extended or adjusted under 35 U.S.C. 154(b) by 601 days.

(21) Appl. No.: 15/755,807

(22) PCT Filed: Aug. 31, 2016

(86) PCT No.: PCT/US2016/049627
§ 371 (c)(1),
(2) Date: Feb. 27, 2018

(87) PCT Pub. No.: WO2017/044360
PCT Pub. Date: Mar. 16, 2017

(65) Prior Publication Data
US 2018/0329098 A1   Nov. 15, 2018

Related U.S. Application Data

(60) Provisional application No. 62/215,463, filed on Sep. 8, 2015.

(51) Int. Cl.
*G01V 1/38*       (2006.01)
*G01V 1/145*      (2006.01)
*G01V 1/135*      (2006.01)

(52) U.S. Cl.
CPC ........... *G01V 1/3817* (2013.01); *G01V 1/135* (2013.01); *G01V 1/145* (2013.01); *G01V 1/3843* (2013.01); *G01V 1/38* (2013.01)

(58) Field of Classification Search
CPC ...... G01V 1/3817; G01V 1/135; G01V 1/145; G01V 1/3843; G01V 1/38
See application file for complete search history.

(56) References Cited

U.S. PATENT DOCUMENTS 2,981,073 A * 4/1961 Robinson, Jr. .......... B63C 11/48
                                                    348/81
4,198,706 A * 4/1980 Elliott .................... G01V 1/137
                                                    367/148

(Continued)

FOREIGN PATENT DOCUMENTS

JP   H10100990 A   4/1998
RU      13929 U1   6/2000

(Continued)

*Primary Examiner* — Krystine E Breier

(57) ABSTRACT

Methods are provided to package and deploy a marine vibrator for use in connection with marine seismic surveys. Marine vibrators are provided with a number of buoyancy configurations with corresponding techniques for controlling the submergence depth of the marine vibrators. An exemplary marine vibrator comprises a positively buoyant hydrodynamic tow body, comprising: a low frequency electro-acoustic projector; a power electronics system; a control-monitoring electronics system; and a pressure compensation system, wherein the hydrodynamic tow body comprises one or more active control surfaces to adjust a submergence depth and a roll attitude of the hydrodynamic tow body. Additional embodiments employ a free-flooding, load-bearing frame with positive or negative buoyancy.

7 Claims, 3 Drawing Sheets

(56) References Cited

U.S. PATENT DOCUMENTS

| | | | |
|---|---|---|---|
| 9,535,179 B2* | 1/2017 | Chelminski | G01V 1/135 |
| 10,473,803 B2* | 11/2019 | Tenghamn | G01V 1/38 |
| 2010/0058967 A1* | 3/2010 | Baylot | E21B 7/124 |
| | | | 114/221 A |
| 2010/0060286 A1* | 3/2010 | Summerfield | G01V 3/12 |
| | | | 324/334 |
| 2011/0149681 A1* | 6/2011 | Hovland | G01V 1/3826 |
| | | | 367/15 |
| 2011/0317515 A1* | 12/2011 | Tenghamn | G10K 9/121 |
| | | | 367/20 |
| 2012/0287751 A1* | 11/2012 | Elvestad | G01V 1/38 |
| | | | 367/16 |
| 2013/0051180 A1* | 2/2013 | Chelminski | G01V 1/135 |
| | | | 367/143 |
| 2014/0226439 A1* | 8/2014 | Tenghamn | B06B 1/045 |
| | | | 367/15 |
| 2015/0234072 A1* | 8/2015 | McConnell | G01V 1/145 |
| | | | 367/156 |

FOREIGN PATENT DOCUMENTS

| | | | |
|---|---|---|---|
| WO | 9935513 | A2 | 7/1999 |
| WO | 2008008127 | A2 | 1/2008 |

* cited by examiner

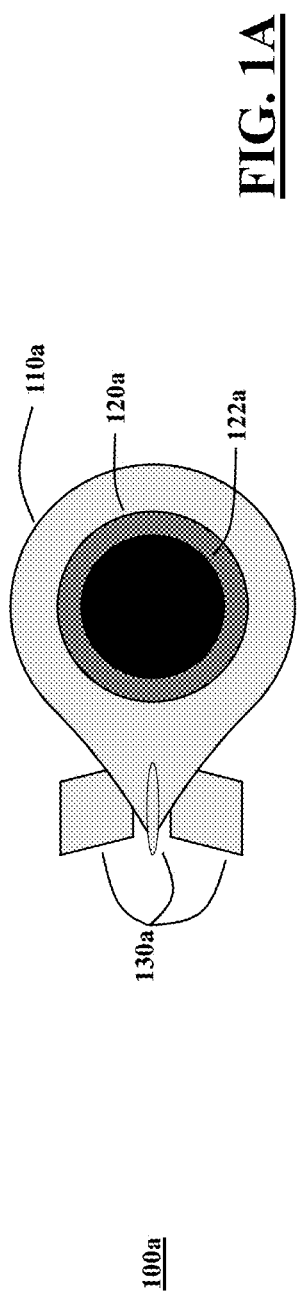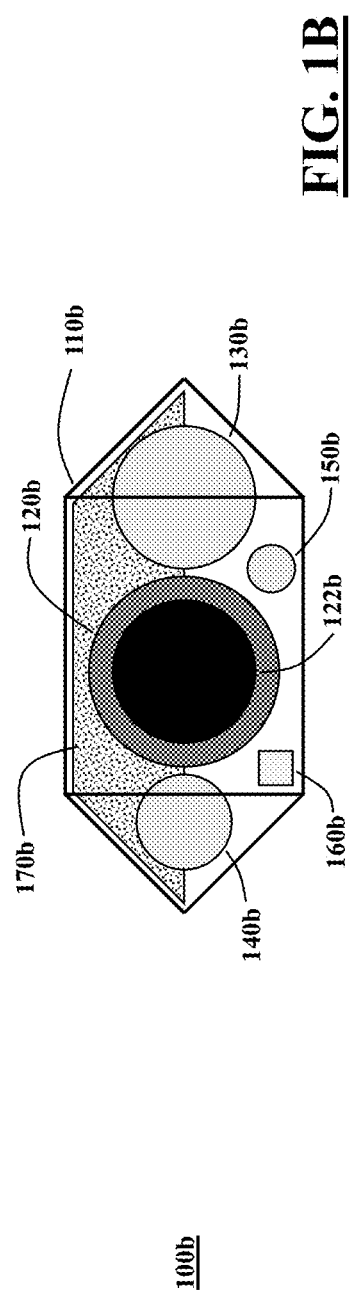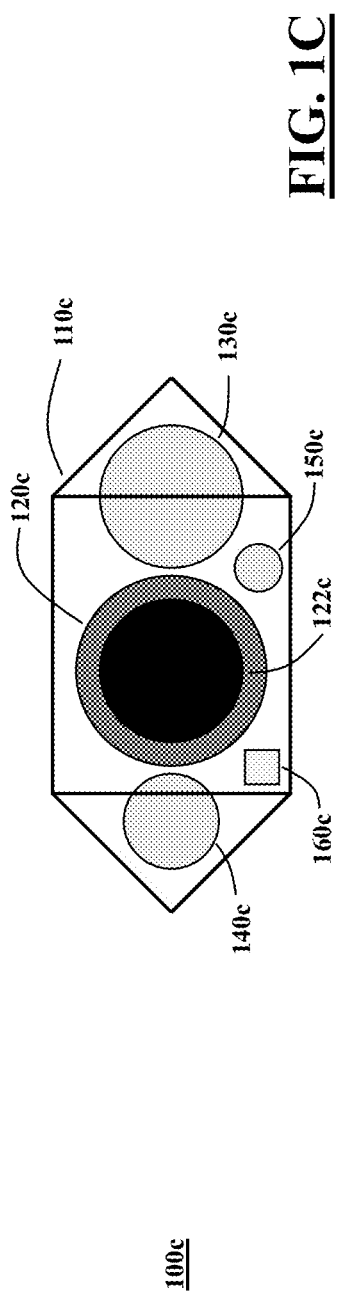

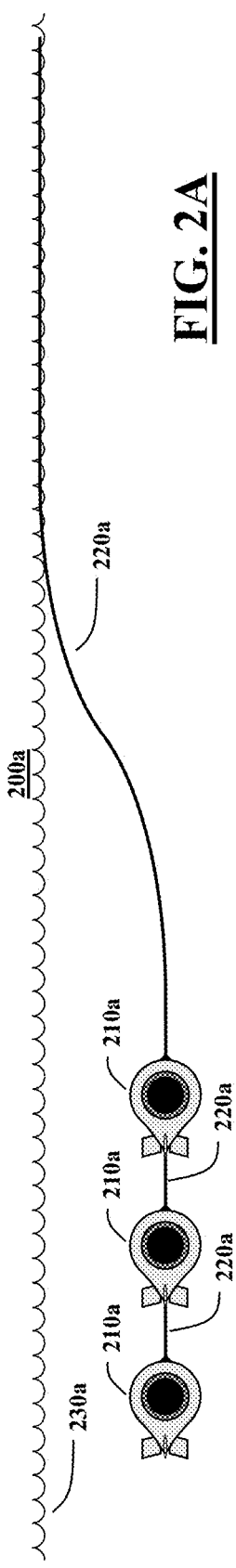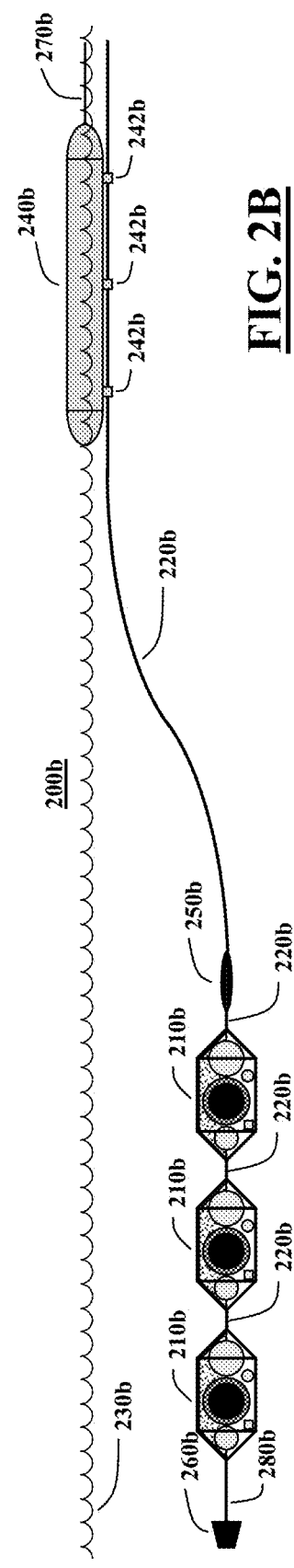

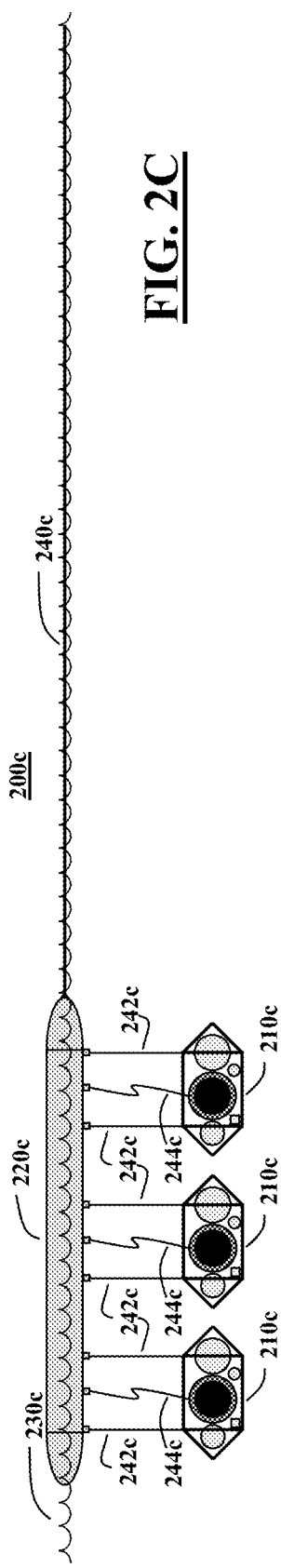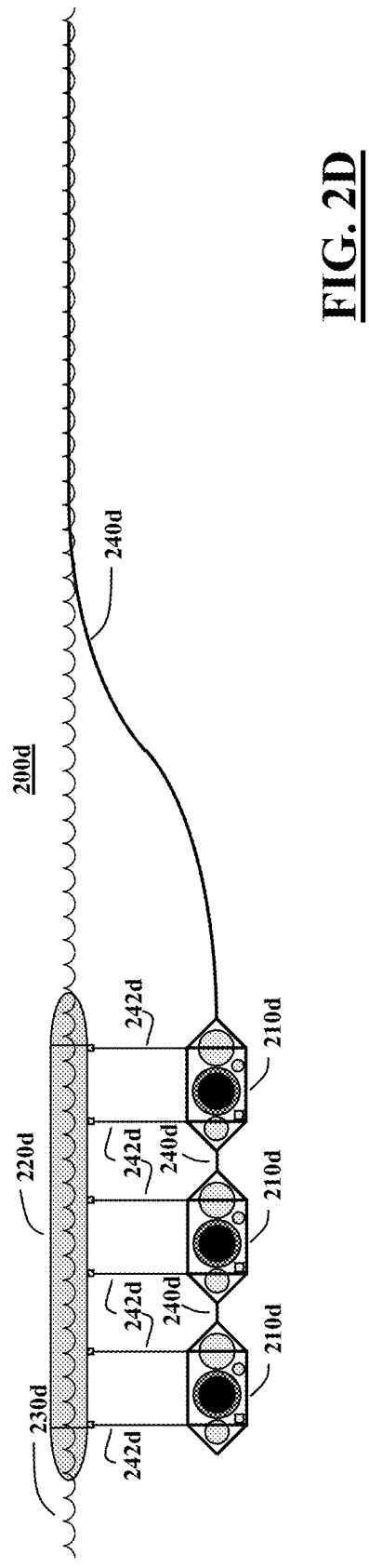

METHOD OF PACKAGING AND DEPLOYING MARINE VIBRATOR

CROSS-REFERENCE TO RELATED APPLICATIONS

The present application claims priority to U.S. Provisional Patent Application Ser. No. 62/215,463, filed Sep. 8, 2015, entitled "Method of Packaging and Deploying Marine Vibrator," incorporated by reference herein. The present application is related to U.S. patent application Ser. No. 14/421,006, filed Feb. 11, 2015 (now U.S. Pat. No. 9,625,598), and U.S. patent application Ser. No. 14/700,879, filed Apr. 30, 2015 (now U.S. Pat. No. 9,562,982), each entitled "Coherent Sound Source for Marine Seismic Surveys," and each incorporated by reference herein.

FIELD OF THE INVENTION

The present invention relates generally to a method of packaging and deploying low frequency underwater sound projectors for use in connection with marine seismic surveys.

BACKGROUND OF THE INVENTION

Sound waves are the primary tool used to search for oil and gas reserves beneath the Earth's strata. Sound waves are convenient because they can propagate over long distances and penetrate into complex layered media to obtain important information regarding the presence, composition, and physical extent of reserves. This is the case for surveys conducted on both land and water. Although a variety of methods have been used to generate sound waves in water, the primary technique over the past three decades is the use of air guns, which expel short bursts of high-pressure air and constitute an impulsive (i.e., incoherent) source of acoustic energy. The waves penetrate into the strata and differentially reflect back towards the surface where they are recorded by an array of receivers (i.e., hydrophones).

Generally speaking, marine seismic surveys are performed by towing 12 to 48 air guns in the form of multiple sub-arrays 300 to 500 m behind a survey vessel at depths on the order of 1 to 10 m. A series of surface floats are used to suspend the air guns (i.e., one float per sub-array) at the prescribed depth. An umbilical containing strength members, electrical power cables, a duplex data transfer medium (i.e., copper or fiber optic link), and a high-pressure air hose is used to tow the surface float from a survey vessel. A secondary purpose of the umbilical is to route high-pressure air to the air gun array, as well as electrical power to control various aspects of the array, and provide means to command the array and obtain monitoring data from various engineering sensors to ensure satisfactory operation is evident. Typical tow speeds range from 1.5 to 2.5 m/s which facilitates survey rates on the order of 10 km²/day. For more information on marine seismic surveys, please consult "Marine Geophysical Operations: An Overview," *International Association of Geophysical Contractors* (June 2009), or "An Overview of Marine Seismic Operations," *International Association of Oil and Gas Producers*, Report No. 448 (April 2011), each incorporated by reference herein.

In recent years, the oil and gas industry has considered alternatives to air guns, and in particular using marine vibrators that can provide a coherent (i.e., non-impulsive) source of acoustic energy. Typically, applications and/or motivations to use marine vibrators in lieu of air guns stem from needing a better seismic signature in certain deep-water operational environments, performing marine seismic surveys in environmentally sensitive areas, and having an improved source for shallow water (i.e., transition zone) applications where air gun arrays perform sub-optimally. Further, attributes of marine vibrator-based seismic surveys that are attractive include (1) having command actuated depth control to mitigate issues related to signal-to-noise ratio at low frequencies and ghosting, and (2) having little to no surface expression (i.e., no floats) given that 40% of the Earth's oil and gas reserves are located in the Arctic where floating ice is a hazard.

SUMMARY OF THE INVENTION

Illustrative embodiments of the present invention provide methods of packaging and deploying marine vibrators. In one exemplary embodiment, a marine vibrator comprises a positively buoyant hydrodynamic tow body, comprising: a low frequency electro-acoustic projector; a power electronics system; a control-monitoring electronics system; and a pressure compensation system, wherein the hydrodynamic tow body comprises one or more active control surfaces to adjust a submergence depth and a roll attitude of the hydrodynamic tow body.

In at least one exemplary embodiment, a marine vibrator comprises a free-flooding, load-bearing frame including internal components, comprising: a low frequency electro-acoustic projector; a power electronics system; a control-monitoring electronics system; and a pressure compensation system, wherein the frame and the internal components are rendered positively buoyant using buoyancy foam positioned within the frame so that a center-of-buoyancy of the frame and the internal components is higher in elevation than a center-of-gravity of the frame and the internal components.

In one or more embodiments, a marine vibrator comprises a free-flooding, load-bearing frame, comprising: a low frequency electro-acoustic projector; a power electronics system; a control-monitoring electronics system; and a pressure compensation system, wherein the marine vibrator is negatively buoyant and wherein a submergence depth of the marine vibrator is controlled using one or more winches positioned in a surface float that suspends the marine vibrator. In at least one embodiment, a tow-point of the marine vibrator is from a forward end of the surface float, while in another exemplary embodiment, the tow-point is from a forward end of the frame.

As noted above, illustrative embodiments described herein provide significant improvements relative to conventional marine vibrators by employing various buoyancy configurations with corresponding techniques for controlling the submergence depth of the marine vibrators. These and other features and advantages of the present invention will become more readily apparent from the accompanying drawings and the following detailed description.

BRIEF DESCRIPTION OF THE DRAWINGS

FIGS. 1A through 1C present elevation drawings showing three different exemplary packaging embodiments for the marine vibrator; and FIGS. 2A through 2D present elevation drawings showing four different exemplary deployment embodiments for a sub-array of marine vibrators.

DETAILED DESCRIPTION

Aspects of the present invention provide methods to package and deploy a marine vibrator for use in connection with marine seismic surveys. A number of different exemplary embodiments are presented which describe how the marine vibrator is packaged and deployed. In a first exemplary embodiment, as discussed further below in conjunction with FIGS. 1A and 2A, the components associated with a marine vibrator (e.g., low frequency electro-acoustic projector, power electronics, control-monitoring electronics, and pressure compensation means) are packaged in a positively buoyant hydrodynamic tow body containing active control surfaces to adjust the submergence depth and maintain a proper roll attitude. Multiple marine vibrators of this design can optionally be arranged to form a line array which is towed by a survey vessel via an umbilical. Multiple line arrays of this type can be configured as a planar or volumetric array.

In a second exemplary embodiment, as discussed further below in conjunction with FIGS. 1B and 2B, the aforementioned marine vibrator components are packaged within a free-flooding, load-bearing frame (or truss) which uses buoyancy foam or some equivalent means to render it positively buoyant. The position of the buoyancy foam within the frame is designed to facilitate passive roll control/stability by virtue of having the center-of-buoyancy higher in elevation than the center-of-gravity. Multiple marine vibrators of this design can optionally be arranged to form a line array which is towed by a survey vessel via an umbilical. The submergence depth and straightness of the array is controlled through the use of static forces in the vertical and horizontal directions resulting from a surface float, umbilical, depressor, and drogue. Multiple line arrays of this type can optionally be configured as a planar or volumetric array.

In a third exemplary embodiment, as discussed further below in conjunction with FIGS. 1C and 2C, the aforementioned components are packaged within a free-flooding, load-bearing frame (or truss) without the use of buoyancy foam, thus rendering the marine vibrator negatively buoyant. Multiple marine vibrators of this design can optionally be arranged to form a line array that is suspended from a surface float which in turn is towed by a survey vessel via an umbilical. The submergence depth of the array is controlled using a series of winches positioned in the surface float. Multiple line arrays of this type can be configured as a planar or volumetric array.

In a fourth exemplary embodiment, as discussed further below in conjunction with FIGS. 1C and 2D, the aforementioned components are packaged within a free-flooding, load-bearing frame (or truss) without the use of buoyancy foam, thus rendering the marine vibrator negatively buoyant. Multiple marine vibrators of this design can optionally be arranged to form a line array that is suspended from a surface float. The forward-most element in the line array serves as the connection point for an umbilical which is used to tow the array from a survey vessel. The submergence depth of the array is controlled using a series of winches positioned in the surface float. Multiple line arrays of this type can optionally be configured as a planar or volumetric array.

FIG. 1A presents an elevation drawing showing a first exemplary packaging embodiment 100a for the disclosed marine vibrator. From the perspective of viewing marine vibrator 100a from the outside, it is seen that marine vibrator 100a is comprised of hydrodynamic tow body 110a which houses electro-acoustic underwater sound projector 120a. The projector employs compliantly suspended piston 122a which vibrates the water at low frequencies using a transducer that resides inside tow body 110a. For a more detailed discussion of compliantly suspended pistons, see, for example, C. H. Sherman and J. L. Butler, Transducers and Arrays for Underwater Sound, pages 51 and 54 (Springer, 1997).

Other features that reside in tow body 110a include, but are not limited to, power electronics to condition and amplify an electrical analog of the waveform that is used to drive the transducer, control-monitoring electronics which provide local control authority and real-time monitoring of all the components and sub-systems, one or more storage tanks (and associated piping and valve network) containing high-pressure gas such as dry air or dry nitrogen to compensate piston 122a as a result of submergence in water, and one or more batteries to provide a temporary source of electrical power to the control-monitoring system during deployment and retrieval operations when power from a survey vessel which deploys marine vibrator 110a may not available.

Hydrodynamic control surfaces 130a are used to control the submergence depth of tow body 110a which is designed to be positively buoyant. Control surfaces 130a also provide the means to maintain proper roll attitude of tow body 110a so that the force vector from the transducer which drives piston 122a is always perpendicular to the Earth's gravity vector. In this way compliantly suspended piston 122a will not statically deflect inward or outward under the action of gravity.

FIG. 1B presents an elevation drawing showing a second exemplary packaging embodiment 100b for the disclosed marine vibrator. From the perspective of viewing marine vibrator 100b from the outside, it is seen that marine vibrator 100b is comprised of numerous components that are positioned inside free-flooding, load-bearing frame (or truss) 110b which serves as the tow body. The components shown within frame 110b include electro-acoustic underwater sound projector 120b with compliantly suspended piston 122b, power electronics module 130b, control-monitoring electronics module 140b, pressure compensation means including a compressed gas storage tank 150b, and battery 160b. All of these components have substantially the same functionality and performance to those described herein for marine vibrator 100a. The only significant difference is how they are packaged.

Marine vibrator 100b is designed to be positively buoyant and employs buoyancy module 170b to offset the weight of the other components. Buoyancy module 170b is typically comprised of either closed-cell foam, syntactic foam, or an air-filled enclosure. Buoyancy module 170b is positioned within frame 110b so that the center-of-buoyancy is above the center-of-gravity in order to impart a passive righting moment to the tow body so that proper roll attitude is maintained. In the event additional roll control is desired, a vertical fin can be added. These features taken separately or together obviate the need for the active control surfaces described for marine vibrator 100a. Depth control for marine vibrator 100b is described later in this section. Further, because all of the components are contained within a load-bearing frame, which can be outfitted with shock isolation mounts and bumpers, embodiment 100b is expected to be more robust to the rigors of deployment/retrieval operations than embodiment 100a.

FIG. 1C presents an elevation drawing showing a third exemplary packaging embodiment 100c for the disclosed marine vibrator. From the perspective of viewing marine vibrator 100c from the outside, it is seen that marine vibrator 100c is identical to marine vibrator 100b with the exception that marine vibrator 100c does not employ a buoyancy module. As such, marine vibrator 100c is negatively buoyant. For completeness, marine vibrator 100c comprises free-flooding, load-bearing frame 110c, electro-acoustic underwater sound projector 120c with compliantly suspended piston 122c, power electronics module 130c, control-monitoring electronics module 140c, compressed gas storage tank 150c, and battery 160c. All of these components have substantially the same functionality and performance to those described herein for marine vibrator 100b. Depth and roll control for marine vibrator 100c is described later in this section.

FIG. 2A presents an elevation drawing showing a first exemplary deployment embodiment 200a for the marine vibrator 100a described in FIG. 1A. As shown in FIG. 2A, the first embodiment considers a line array (i.e., a sub-array) containing three marine vibrators, for example. In practice, the number of elements in the array and how many arrays are deployed is dictated by the seismic survey requirements. The three-element array concept presented in FIG. 2A is hypothetical, but fully illustrates the deployment embodiments associated with the present invention.

Deployment embodiment 200a of FIG. 2A shows marine vibrators 210a towed and interconnected by umbilical 220a beneath water surface 230a. Umbilical 220a is a flexible, load-bearing structure that is connected to a survey vessel (not shown) up to 1 km away and has functionality to transmit electrical power, transmit and receive data, and transmit compressed gas pursuant to operation of marine vibrators 220a. The compressed to gas is used to replenish that supplied by the aforementioned storage tank upon initial deployment. Recall that the gas in the storage tank is used to compensate the piston resulting from the hydrostatic loads associated with submergence in water. A local source of compressed gas is preferred considering the latency issues of providing the gas directly from the survey vessel located up to 1 km away.

As discussed previously, marine vibrators 200a employ self-contained system hydrodynamic control surfaces 130a (shown in FIG. 1A) to change/maintain depth and proper roll attitude. This results in very little surface expression and is attractive for marine seismic surveys that are performed in Arctic waters where floating ice is a hazard.

FIG. 2B presents an elevation drawing showing a second exemplary deployment embodiment 200b for the marine vibrator 100b described in FIG. 1B. Deployment embodiment 200b of FIG. 2B shows marine vibrators 210b towed and interconnected by umbilical 220b beneath water surface 230b. Umbilical 220b has substantially the same functionality of that described earlier for embodiment 200a. The submergence depth of marine vibrators 210b is controlled by the confluence of forces resulting from the location of surface float 240b, depressor 250b, and drogue 260b. That is, the weight of umbilical 220b spanning the distance between surface float 240b and depressor 250b is used to submerge marine vibrators 210b. Accordingly, the position of surface float 240b determines the submergence depth wherein the position is controlled by cable 270b which is connected to a winch on the survey vessel (not shown). Surface float 240b employs guide system (e.g., spring-actuated pinch rollers or equivalent means) 242b to facilitate the positioning process. Depressor 250b and drogue 260b provide the requisite downward and horizontal forces on the towed assembly so that marine vibrators 210b are straight and level during seismic survey operations. Here it is noted that in embodiment 200b, the umbilical interconnects all the components except drogue 250b which is connected to the last element in the array via tether 280b.

It should be stated that alternate umbilical configurations are possible in connection with embodiment 200b. For example, umbilical 220b can optionally terminate at depressor 250b and a mechanical strength member can be used as the means to interconnect marine vibrators 210b with depressor 250b. Electrical power, duplex data, and compressed gas would be facilitated through a network of smaller, flexible umbilicals that are routed from depressor 250b to marine vibrators 210b on a one-to-one correspondence basis. In this way depressor 250b also serves as a forward electronics module.

Embodiment 200b is well-suited, for example, for deep-water surveys that require marine vibrators to be deployed to depths of nominally 5 m or more.

FIG. 2C presents an elevation drawing showing a third exemplary deployment embodiment 200c for the marine vibrator 100c described in FIG. 1C. Deployment embodiment 200c of FIG. 2C shows marine vibrators 210c suspended from surface float 220c and towed beneath water surface 230c using umbilical 240c, which is connected to the forward end of surface float 220c. Umbilical 240c has substantially the same functionality as that described earlier for embodiment 200a. The submergence depth of marine vibrators 210c is controlled by adjusting the length of load-bearing cables 242c using a series of winches (not shown) positioned in surface float 220c. Umbilical 240c is broken out into network of smaller, flexible umbilicals 244c in order to facilitate transmission of electrical power, duplex data, and compressed gas to marine vibrators 210c. The breakout is accomplished using means (not shown) positioned in surface float 220c.

Embodiment 200c is inherently stable from a roll attitude standpoint and well-suited, for example, for shallow- or deep-water surveys that require marine vibrators to be deployed to depths of nominally 5 m or less. Of the three deployment embodiments disclosed herein, embodiment 200c is considered the best for marine seismic surveys performed in the transition zone.

FIG. 2D presents an elevation drawing showing a fourth exemplary deployment embodiment 200d for the marine vibrator 100c described in FIG. 1C. Deployment embodiment 200d of FIG. 2D shows marine vibrators 210d suspended from surface float 220d and towed beneath water surface 230d using umbilical 240d, which is connected to the forward-most marine vibrator 210d. Umbilical 240d has substantially the same functionality as that described earlier for embodiment 200a. The submergence depth of marine vibrators 210d is controlled by adjusting the length of load-bearing cables 242d using a series of winches (not shown) positioned in surface float 220d. Umbilical 240a also serves as the interconnect tow cable between all marine vibrators 210d in the array and facilitates transmission of electrical power, duplex data, and compressed gas to marine vibrators 210d.

Embodiment 200d is inherently stable from a roll-attitude standpoint and well-suited, for example, for shallow- or deep-water surveys that require marine vibrators to be deployed to depths of nominally 5 m or less. Further, embodiment 200d offers flexibility (relative to embodiment 200c) in the tow point connection for the umbilical so that it is compatible with the seismic survey requirements and survey vessel capabilities for deployment and recovery.

Though not shown in FIGS. 2A through 2D, position of line arrays as per embodiments 200a, 200b, 200c, and 200d can be determined through a combination of acoustic means (i.e., ultra-short baseline positioning system) and global positioning system transceivers strategically located on the sub-surface and surface components, including the survey vessel, as appropriate.

CONCLUSION

One or more embodiments of the invention provide methods to package and deploy a marine vibrator for use in connection with marine seismic surveys The foregoing applications and associated embodiments should be considered as illustrative only, and numerous other embodiments can be configured using the techniques disclosed herein, in a wide variety of different marine seismic applications.

It should also be understood that the marine vibrator configurations, as described herein, can be implemented at least in part in the form of one or more software programs stored in memory and executed by a processor of a processing device such as a computer. A memory or other storage device having such program code embodied therein is an example of what is more generally referred to herein as a "computer program product."

The disclosed marine vibrator configurations may be implemented, at least in part, using one or more processing platforms. One or more of the processing modules or other components may therefore each run on a computer, storage device or other processing platform element. A given such element may be viewed as an example of what is more generally referred to as a "processing device."

It is thus to be understood that the embodiments described herein are merely illustrative of the principles of this invention and that various modifications may be implemented by those skilled in the art without departing from the scope and spirit of the invention.

What is claimed is:

1. A marine vibrator, comprising:
   a free-flooding, load-bearing frame, wherein the free-flooding, load-bearing frame is suspended from a surface float and comprises:
   a low frequency electro-acoustic projector;
   a power electronics system;
   a control-monitoring electronics system; and
   a pressure compensation system,
   wherein said marine vibrator is negatively buoyant and wherein a submergence depth of the marine vibrator is primarily controlled using one or more winches positioned in the surface float that suspend the marine vibrator from the surface float by one or more load-bearing cable assemblies connected to the marine vibrator, wherein a tow point is located on one or more of a forward end of the surface float with respect to the direction in which the marine vibrator is towed and from a forward end of the free-flooding, load-bearing frame with respect to the direction in which the marine vibrator is towed, wherein a plurality of the marine vibrators is arranged in a line array, and wherein the submergence depth of the marine vibrator is controlled separately from the submergence depth of at least one other marine vibrator in the line array.

2. The marine vibrator of claim 1, wherein a plurality of the marine vibrators is arranged in a line array and suspended directly below the surface float and towed by a survey vessel via a load-bearing, flexible umbilical and comprising functionality to transmit one or more of electrical power, data, and compressed gas to said line array and to receive data from said line array.

3. The marine vibrator of claim 1, wherein at least one winch of the one or more winches is positioned within an interior space of the surface float.

4. The marine vibrator of claim 1, wherein a plurality of the line arrays is positioned to form a planar or volumetric array towed beneath the water surface by a survey vessel.

5. The marine vibrator of claim 1, wherein said free-flooding, load-bearing frame further comprises a source of local electrical power and high-pressure gas.

6. The marine vibrator of claim 1, wherein the marine vibrator has a fixed negative buoyancy.

7. The marine vibrator of claim 1, wherein the submergence depth of the marine vibrator depends on the lengths of the one or more load-bearing cable assemblies that suspend the marine vibrator.

* * * * *